(12) United States Patent
Gumpoltsberger

(10) Patent No.: US 7,591,752 B2
(45) Date of Patent: Sep. 22, 2009

(54) MULTI-SPEED TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 378 days.

(21) Appl. No.: 11/704,877

(22) Filed: Feb. 9, 2007

(65) Prior Publication Data

US 2008/0015079 A1   Jan. 17, 2008

(30) Foreign Application Priority Data

Feb. 14, 2006   (DE) .................. 10 2006 006 645

(51) Int. Cl.
*F16H 3/62* (2006.01)
(52) U.S. Cl. ...................................... 475/276
(58) Field of Classification Search ............... None
See application file for complete search history.

(56) References Cited

U.S. PATENT DOCUMENTS

| | | | |
|---|---|---|---|
| 4,395,925 A | 8/1983 | Gaus | |
| 5,106,352 A | 4/1992 | Lepelletier | |
| 6,139,463 A | 10/2000 | Kasuya et al. | |
| 6,558,287 B2 | 5/2003 | Hayabuchi et al. | |
| 6,572,507 B1 | 6/2003 | Korkmaz et al. | |
| 6,623,397 B1 * | 9/2003 | Raghavan et al. | 475/276 |
| 6,634,980 B1 | 10/2003 | Ziemer | |
| 6,634,981 B1 * | 10/2003 | Raghavan et al. | 475/275 |
| 6,679,803 B1 * | 1/2004 | Raghavan et al. | 475/276 |
| 6,860,831 B2 | 3/2005 | Ziemer | |
| 7,018,319 B2 | 3/2006 | Ziemer | |
| 7,086,987 B2 * | 8/2006 | Janson et al. | 475/284 |
| 7,094,173 B2 * | 8/2006 | Raghavan et al. | 475/276 |
| 2007/0213169 A1 * | 9/2007 | Gumpoltsberger | 475/275 |

FOREIGN PATENT DOCUMENTS

| | | |
|---|---|---|
| DE | 29 36 969 | 4/1981 |
| DE | 199 12 480 | 9/2000 |
| DE | 199 49 507 | 4/2001 |
| DE | 101 15 983 | 10/2002 |
| DE | 101 15 987 | 10/2002 |
| DE | 102 13 820 | 10/2002 |
| EP | 0 434 525 | 6/1991 |

* cited by examiner

*Primary Examiner*—Dirk Wright
(74) *Attorney, Agent, or Firm*—Davis & Bujold, P.L.L.C.

(57) ABSTRACT

The multi-speed transmission with one reverse and seven forward gears has input and output shafts, three planetary gear sets, six shafts and six shifting elements. The input shaft couples the sun gear of gear set (P2) and detachably couples shaft (5), which couples the carrier of gear set (P3), and detachably couples the housing and shaft (4). Shaft (4) couples the carrier of gear set (P2), detachably couples the housing via brake (04), and detachably couples shaft (6) via clutch (46), which couples the sun gear of gear set (P3) and the hollow gear of gear set (P1). Shaft (3) couples the ring gear of gear set (P2) and the carrier of gear set (P1), the sun gear of gear set (P1) couples the housing, the output shaft couples the ring gear of gear set (P3). Either, shaft (3) or shaft (6) is detachably coupled to the housing.

23 Claims, 4 Drawing Sheets

|     | 1.   | 2.   | 3.   | 4.   | 5.   | 6.   | 7.   | R1.   |
|-----|------|------|------|------|------|------|------|-------|
| i_G: | 4.00 | 2.41 | 1.62 | 1.18 | 0.84 | 0.67 | 0.57 | -3.24 |
| phi: | 7.00 | 1.66 | 1.49 | 1.37 | 1.41 | 1.26 | 1.17 | -0.81 |
| |03| |      | x    |      |      |      | x    |      |       |
| |04| |      |      |      |      |      |      | x    |       |
| |05| | x    |      |      |      |      |      |      | x     |
| |15| |      |      |      | x    | x    | x    | x    |       |
| |45| | x    | x    | x    | x    |      |      |      |       |
| |46| |      |      | x    |      | x    |      |      | x     |

| | 1. | 2. | 3. | 4. | 5. | 6. | 7. | R1. |
|---|---|---|---|---|---|---|---|---|
| i_G: | 4.00 | 2.41 | 1.62 | 1.18 | 0.84 | 0.67 | 0.57 | -3.24 |
| phi: | 7.00 | 1.66 | 1.49 | 1.37 | 1.41 | 1.26 | 1.17 | -0.81 |
| \|06\| | | x | | | | x | | |
| \|04\| | | | | | | | x | |
| \|05\| | x | | | | | | | x |
| \|15\| | | | | x | x | x | x | |
| \|45\| | x | x | x | x | | | | |
| \|46\| | | | x | | x | | | x |

MULTI-SPEED TRANSMISSION

This application claims priority from German Application Serial No. 10 2006 006 645.6 filed Feb. 14, 2006.

FIELD OF THE INVENTION

The invention concerns a multi-speed transmission of planetary construction, in particular an automatic transmission for a motor vehicle, according to the preamble of patent claim 1.

BACKGROUND OF THE INVENTION

Automatic transmissions, in particular for motor vehicles, comprise, according to the state of the art, planetary gear sets, which are shifted by means of friction elements or shifting elements, such as possibly clutches and brakes, and are usually connected to a starting element that is subjected to a slip effect and is selectively provided with a lockup clutch, such as a hydrodynamic torque converter or a fluid clutch.

A transmission such as this is disclosed in EP 0 434 525 A1. It comprises essentially an input shaft and an output shaft, which are arranged parallel to each other, a double planetary gear set arranged concentrically with the output shaft, and five shifting elements in the form of three clutches and two brakes, whose selective lockup, in pairs, determines pairs the various gear ratios between the input shaft and the output shaft. The transmission thus comprises a front-mounted gear set and two power paths, so that six forward gears can be achieved by selectively engaging the five shifting elements in pairs.

Two clutches are required for the transmission of torque from the front-mounted gear set to two elements of the double planetary gear set in the first power path. These are arranged in the direction of power flow essentially behind the front-mounted gear set in the direction of the double planetary gear set. Another clutch is provided in the second power path, which detachably connects the path to another element of the double planetary gear set. The clutches are thus arranged in such a way that the inner disk carrier forms the output.

A compact multi-speed transmission of planetary construction, in particular for a motor vehicle, which comprises two planetary gear sets and one front-mounted gear set, as well as three clutches and two brakes, is also known from U.S. Pat. No. 6,139,463. In this known multi-speed transmission, two clutches C-1 and C-3 are provided in a first power path for transmitting torque from the front-mounted gear set to the two planetary gear sets. Here, the outer disk carrier and/or the cylinder or piston and pressure compensating side of the clutch C-3 is connected to a first brake B-1. In addition, the inner disk carrier of the third clutch C-3 is connected to the cylinder or piston and pressure compensating side of the first clutch C-1, wherein the inner disk carrier of the first clutch C-1 is arranged on the output side and is connected to a sun gear of the third planetary gear set.

From DE 199 49 507 A1 by the applicant a multi-speed transmission is additionally known, in which two non-shiftable front-mounted gear sets are provided on the input shaft, which generate two rotational speeds on the output side, which, aside from the rotational speed of the input shaft, can be optionally shifted to a shiftable double planetary gear set acting on the output shaft by selectively engaging the shifting elements in such a way that in order to shift from one gear to the next higher or lower gear, only one shifting element of the two shifting elements just actuated has to be engaged or disengaged.

From DE 199 12 480 A1 an automatically shiftable motor vehicle transmission is known, which comprises three single carrier planetary gear sets as well as three brakes and two clutches for shifting six forward gears and one reverse gear, and one input shaft and one output shaft. The automatically shiftable motor vehicle transmission is configured in such a way that the input shaft is connected directly to the sun gear of the second planetary gear set and the input shaft can be connected to the sun gear of the first planetary gear set, via the first clutch, and/or to the carrier of the first planetary gear set, via the second clutch. In addition or as an alternative, the sun gear of the first planetary gear set can be connected to the housing of the transmission by way of the first brake and/or the carrier of the first planetary gear set can be connected to the housing by way of the second brake and/or the sun gear of the third planetary gear set can be connected to the housing by way of the third brake.

From DE 102 13 820 A1 an automatic multi-speed transmission is further known, which comprises a first input path T1 of a first gear ratio; an input path T2, which has a greater gear ratio than the input path T1; a planetary gear set with four elements, wherein the four elements are arranged in the direction of power flow in the order of a first element, a second element, a third element, and a fourth element; a clutch C-2, which transmits rotation of the input path T2 to the first element S3; a clutch C-1, which transmits rotation from the input path T2 to the fourth element S2; a clutch C-4, which transmits rotation from the input path T1 to the first element; a clutch C-3, which transmits rotation from the input path T1 to the second element C3; a brake B-1, which induces engagement of the fourth element; a brake B-2, which induces engagement of the second element; and an output element, which is coupled to the third element R3.

Within the scope of DE 101 15 983 A1 of the applicant, a multi-speed transmission is described, which comprises an input shaft that is connected to a front-mounted set, an output shaft that is connected to a rear-mounted set, and a maximum of seven shifting elements, whose selective shifting allows at least seven forward gears to be shifted without a range shift. The front-mounted set is comprised of a front-mounted planetary gear set or a maximum of two non-shiftable front-mounted planetary gear sets that are coupled to the first front-mounted planetary gear set, wherein the rear-mounted set is configured as a two-carrier, four-shaft transmission with two shiftable, rear-mounted planetary gear sets, and has four free shafts. The first free shaft of this two-carrier, four-shaft transmission is connected to the first shifting element; the second free shaft is connected to the second and third shifting elements; the third free shaft is connected to the fourth and fifth shifting elements; and the fourth free shaft is connected to the output shaft. For a multi-speed transmission with a total of six shifting elements, it is proposed according to the invention to additionally connect the third free shaft or the first free shaft of the rear-mounted set to a sixth shifting element. For a multi-speed transmission with a total of seven shifting elements, it is proposed according to the invention to additionally connect the third free shaft to a sixth shifting element D' and to additionally connect the first free shaft to a seventh shifting element.

A multi-speed transmission with at least seven gears is furthermore described within the scope of DE 101 15 987 of the applicant. This transmission consists, in addition to the input shaft and the output shaft, of a non-shiftable front-mounted gear set and a shiftable rear-mounted gear set in the form of a two-carrier, four-shaft transmission. The front-mounted gear set consists of a first planetary gear set, which offers, in addition to the input rotational speed of the input shaft, a second rotational speed, which can be optionally applied to a rear-mounted gear set. The rear-mounted gear set consists of two shiftable, planetary gear sets, which can shift into at least seven gears using the six shifting elements, whereupon two power paths are formed. Range shifts are thus advantageously always prevented during each shifting operation. A 9-gear multi-speed transmission is furthermore known from DE 29 36 969; it comprises eight shifting elements and four gear sets.

Automatically shiftable motor vehicle transmissions of planetary construction have been described multiple times in the prior art and are subject to continuous development and improvement. These transmissions should have a sufficient number of forward gears as well as one reverse gear and a gear ratio spread that is well suited for motor vehicles, with a high overall transmission ratio spread as well as favorable progressive ratios. They should further enable a high starting gear ratio in the forward direction and should contain a direct gear, and should be suitable for use in both passenger vehicles and commercial vehicles. In addition, these transmissions should require a low construction expenditure, in particular a small number of shifting elements, and should prevent double-shifting during sequential shifting, so that only one shifting element is changed when shifting into defined gear groups.

SUMMARY OF THE INVENTION

It is the object of the invention to propose a multi-speed transmission of the kind described above, in which the design complexity is simplified and the efficiency in the main travel gears is improved in terms of drag and gearing losses. A low torque should act on the shifting elements and planetary gear sets and the rotational speeds of the shafts, shifting elements, and planetary gear sets should also be kept as low as possible with the multi-speed transmission of the invention. The number of gears as well as the spread of transmission ratios should also be increased, so that seven forward gears and at least one reverse gear can be advantageously realized. The transmission of the invention should furthermore be suited for any vehicle design, especially for a front-transverse arrangement.

A multi-speed transmission of planetary construction is accordingly proposed, which comprises an input shaft and an output shaft, which are arranged in a housing. At least three planetary gear sets, which in the following will be referred to as the first, second and third planetary gear sets, at least six rotatable shafts, which in the following will be referred to as the input shaft, output shaft, third, fourth, fifth and sixth shafts, as well as at least six shifting elements, comprising brakes and clutches, are provided, whose selective engagement creates different gear ratios between the input shaft and the output shaft, so that preferably seven forward gears and one reverse gear can be realized.

The input shaft is herein connected to the sun gear of the second planetary gear set and can be releasably connected by way of a clutch to the fifth shaft, which is permanently connected to the carrier of the third planetary gear set, can be coupled to the housing by way of a brake, and can be releasably connected to the fourth shaft by way of a further clutch. According to the invention, the fourth shaft is permanently connected to the carrier of the second planetary gear set, can be coupled to the housing by way of a brake, and can be releasably connected to the sixth shaft by way of a further clutch, which is permanently connected to the sun gear of the third planetary gear set and the ring gear of the first planetary gear set.

In addition, the third shaft is permanently connected to the gear of the second planetary gear set and to the carrier of the first planetary gear set, wherein the sun gear of the first planetary gear set is connected in a rotationally fixed manner to the housing, and the output shaft is permanently connected to the ring gear of the third planetary gear set. According to the invention, either the third shaft can be coupled to the housing by way of a brake or the sixth shaft can be coupled to the housing by way of a brake.

The configuration of the multi-speed transmission according to the invention induces suitable gear ratios, particularly for passenger vehicles, as well as a significant increase in the overall transmission ratio spread of the multi-speed transmission, whereby an improvement in driving comfort and a significant decrease in fuel consumption are brought about.

Furthermore, the design complexity is considerably reduced with the multi-speed transmission according to the invention due to the low number of shifting elements, preferably three brakes and three clutches. It is advantageously possible with the multi-speed transmission according to the invention to carry out a startup with a hydrodynamic converter, a hydrodynamic clutch, an external starting clutch, or also with other suitable external starting elements. It is also conceivable to enable a starting procedure with a starting element that is integrated into the transmission. A shifting element, which is actuated in the first forward gear and in the reverse gear, is preferably suitable.

The multi-speed transmission according to the invention further achieves good efficiency in the main travel gears with regard to drag and gearing losses.

Furthermore, low torque is present in the shifting elements and in the planetary gear sets of the multi-speed transmission, whereby the wear in the multi-speed transmission is advantageously reduced. The low torque enables a correspondingly smaller dimension, whereby the required installation space and corresponding costs are reduced. Aside from this, low rotational speeds are also present at the shafts, the shifting elements, and the planetary gear sets.

The transmission according to the invention, moreover, is designed in such a way that an adaptation to different drive train configurations, both in the power flow direction and also from a spatial point of view, is made possible.

BRIEF DESCRIPTION OF THE DRAWINGS

The invention will be explained in more detail in the following based on the examples represented in the drawings, wherein.

DETAILED DESCRIPTION OF THE DRAWINGS

Figures 1, 2:
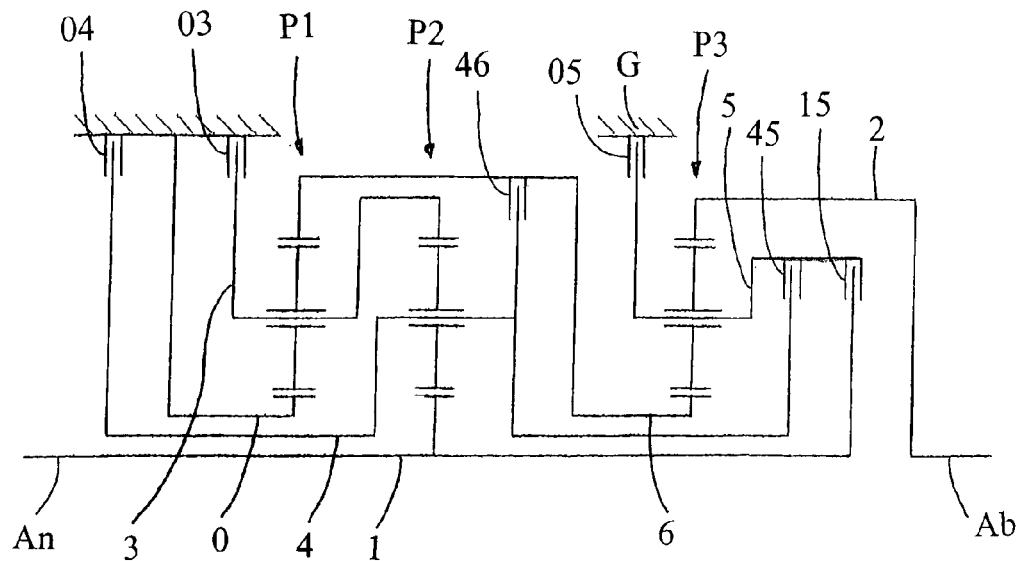
FIG. 1 shows a schematic view of a preferred embodiment of a multi-speed transmission according to the invention.
FIG. 2 shows an exemplary schematic diagram of a multi-speed transmission of FIG. 1 according to the invention.

In FIG. 1 a multi-speed transmission according to the invention is depicted, comprising an input shaft 1 (An) and an output shaft 2 (Ab), which are arranged in a housing G. Three planetary gear sets P1, P2 and P3 are provided, which are preferably configured as negative planetary gear sets and are arranged in the sequential order of P1, P2, P3 in an axial direction.

As is shown in FIG. 1, only six shifting elements, namely three brakes 03, 04, 05 and three clutches 15, 45, and 46, are provided. By selectively shifting these shifting elements, seven forward gears and one reverse gear can be realized. The multi-speed transmission according to the invention has a total of six rotatable shafts, namely the shafts 1, 2, 3, 4, 5, and 6.

In the multi-speed transmission according to the invention and shown in FIG. 1, it is provided that the input is carried out by means of the shaft 1, which is permanently connected to the sun gear of the second planetary gear set P2 and can be releasably connected by way of a clutch 15 to the shaft 5, which is permanently connected to the carrier of the third planetary gear set P3, can be coupled to the housing G by way of a brake 05, and can be releasably connected to the shaft 4 by way of a clutch 45. The shaft 4 is permanently connected to the carrier of the second planetary gear set P2, can be coupled to the housing G by way of a brake 04, and can be releasably connected to the shaft 6 by way of a clutch 46, wherein the shaft 6 is permanently connected to the sun gear of the third planetary gear set P3 and the ring gear of the first planetary gear set P1. The shaft 3 is also permanently connected to the ring gear of the second planetary gear set P2 and to the carrier of the first planetary gear set P1, and can be coupled to the housing G by way of the brake 03, wherein the sun gear of the first planetary gear set P1 is connected in a rotationally fixed manner to the housing G (shaft 0).

The output occurs by way of the shaft 2, which is permanently connected to the ring gear of the third planetary gear set P3.

The clutches 45 and 15, when viewed axially in the direction of power flow, are arranged ahead of the third planetary gear set P3 in the sequence 15, 45 and can have a joint outer disk carrier as disk clutches within the scope of the embodiment shown.

The spatial arrangement of the shifting elements can be freely selected and is limited only by the dimensions and the outer shape.

In FIG. 2 an exemplary schematic diagram of the multi-speed transmission of FIG. 1 according to the invention is depicted. Two shifting elements are engaged in each gear. The schematic diagram shows, as an example, the respective gear ratios i of the individual gear ratios and the progression ratios phi to be determined therefrom. It can also be seen in the schematic diagram that double shifting or range shifts are prevented in the sequential shifting operation, since two adjoining gear steps jointly utilize one shifting element.

The first gear is achieved by engaging the brake 05 and the clutch 45, the second gear is achieved by engaging the brake 03 and the clutch 45, and the third gear is achieved by engaging the clutches 45 and 46. In addition, the fourth gear is achieved by engaging the clutch 15 and the clutch 45, the fifth gear is achieved by engaging the clutches 15 and 46, the sixth gear is achieved by engaging the brake 03 and the clutch 15, and the seventh gear is achieved by engaging the brake 04 and the clutch 15. As can be seen in the schematic diagram, the reverse gear is achieved by engaging the brake 05 and the clutch 46.

Initiating drive is possible according to the invention with an integrated shifting element (IAK), for which the brake 05 is particularly suitable, which is required in the first forward gear and in the reverse gear. Different gear steps can also be achieved with the same transmission diagram, depending on the shifting logic, so that a variation that specifically adapted to the application and/or vehicle is made possible.

Figures 3, 4:
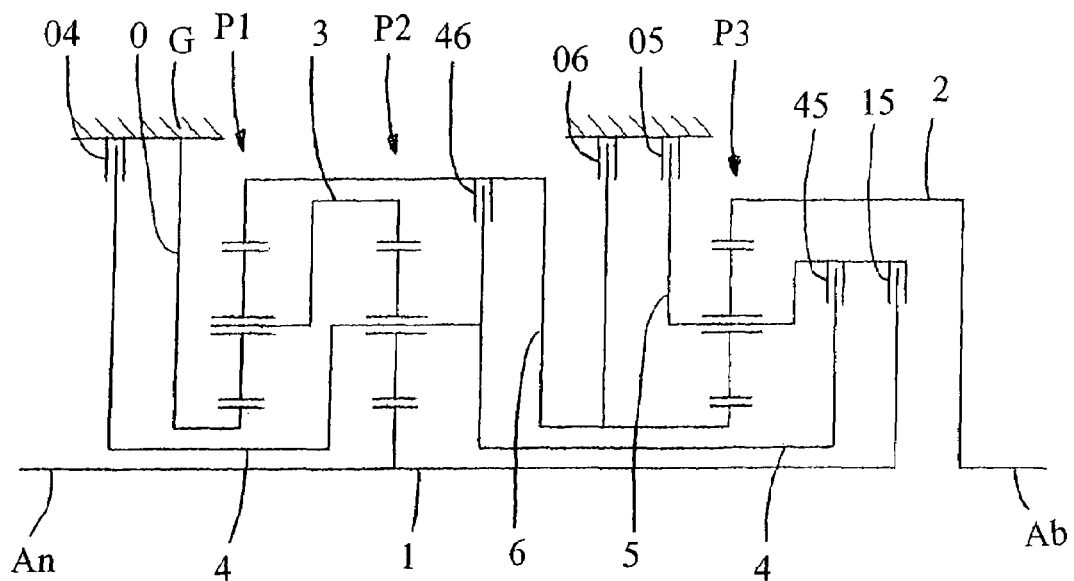
FIG. 3 shows a schematic view of another preferred embodiment of the multi-speed transmission according to the invention.
FIG. 4 shows an exemplary schematic diagram of a multi-speed transmission according to FIG. 3.

The exemplary embodiment shown in FIG. 3 differs from the exemplary embodiment according to FIG. 1 in that the shaft 6 can be coupled to the housing G by way of a brake 06, while the brake 03 is eliminated. The corresponding schematic diagram is shown in FIG. 4, with the difference from the schematic diagram of FIG. 2 that the brake 03 is replaced by the brake 06.

Figure 10:
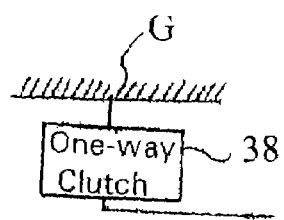
FIG. 10 is a diagrammatic view of an embodiment of the inventive multi-speed transmission having a one-way clutch.

In addition, as shown in FIG. 10, it is possible to provide an additional one-way clutch 38 at each suitable point in the multi-speed transmission, for example, between a shaft and the housing or between two shafts, if required.

Figure 5:
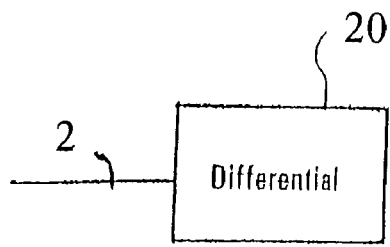
FIG. 5 is a diagrammatic view of an embodiment of the inventive multi-speed transmission having a differential.

An axle differential and/or a distributor differential 20 can be arranged at the input side or at the output side according to the invention, and shown in FIG. 5.

Figure 6:
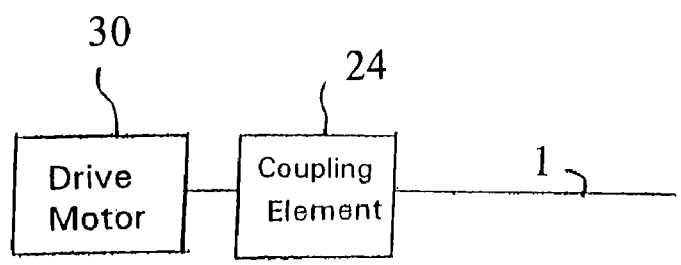
FIG. 6 is a diagrammatic view of an embodiment of the inventive multi-speed transmission with a coupling element and a drive motor.
Figure 7:
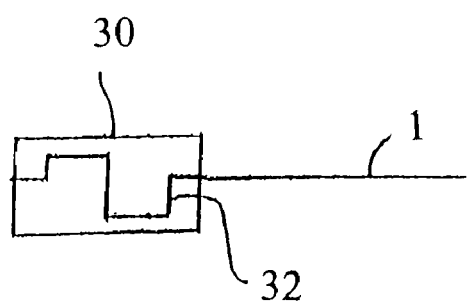
FIG. 7 is a diagrammatic view of an embodiment of the inventive multi-speed transmission with a crankshaft of the drive motor fixed to an input shaft of the multi-speed transmission.
Figure 14:
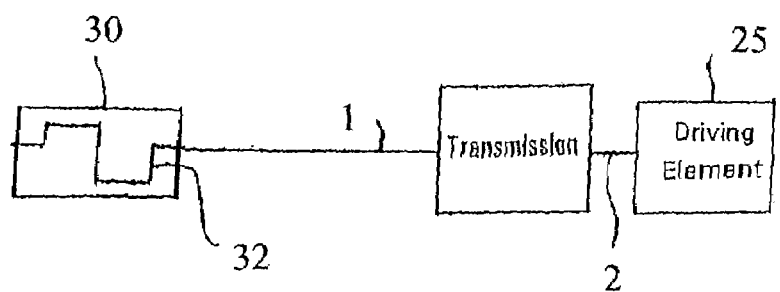
FIG. 14 is a diagrammatic view of another embodiment of the inventive multi-speed transmission with the crankshaft of the drive motor fixed to the input shaft of the multi-speed transmission and the coupling element located behind the multi-speed transmission.

Within the scope of an advantageous further development as shown in FIG. 6, the input shaft 1 can be separated, if required, from a drive motor 30 by means of a coupling element 24, wherein a hydrodynamic converter, a hydraulic clutch, a dry starting clutch, a wet starting clutch, a magnetic powder clutch, or a centrifugal clutch can be used as the coupling element. It is also feasible to arrange such a driving element 25, in the power flow direction behind the transmission as shown in FIG. 14, in which case the input shaft 1 is permanently connected to the crankshaft of the drive motor 30 and shown in FIGS. 7 and 14.

Figure 8:
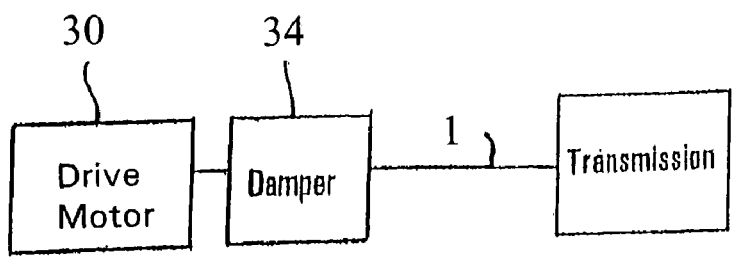
FIG. 8 is a diagrammatic view of an embodiment of the inventive multi-speed transmission having the drive motor communicating with a damper.

The multi-speed transmission, according to the invention, also makes it possible to arrange a torsional vibration damper 34 between the drive motor 30 and the transmission, as shown in FIG. 8.

Figure 9:
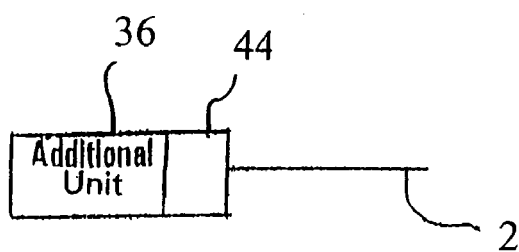
FIG. 9 is a diagrammatic view of an embodiment of the inventive multi-speed transmission with a power take-off for driving an additional unit.
Figure 12:
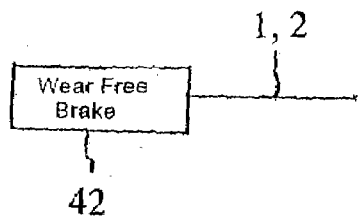
FIG. 12 is a diagrammatic view of a preferred design of the inventive multi-speed transmission having a wear free brake.
Figure 13:
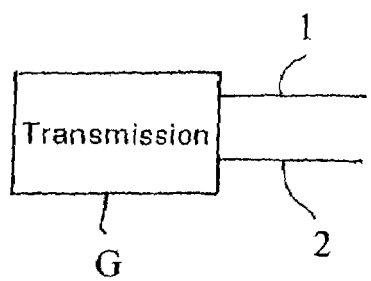
FIG. 13 is a diagrammatic view of a further embodiment of the invention with the input and the output being provided on the same side of the multi-speed transmission housing.

Within the scope of a further embodiment shown in FIG. 12 of the invention, a wear-free brake 42, for example, a hydraulic or electric retarder or the like, can be arranged on each shaft, preferably on the input shaft 1 or the output shaft 2, which is of particular importance for use in commercial vehicles. A power take-off 44 can also be provided, as shown in FIG. 9, on each shaft, to drive an additional unit 36, preferably on the input shaft 1 or the output shaft 2. Additionally, as shown in FIG. 13, the input and output are provided on the same side of the housing G.

The shifting elements that are used can be configured as power shifting clutches or power shifting brakes. Friction locking clutches or friction locking brakes, such as, for example, disk clutches, band brakes, and/or cone clutches, can be used. Moreover, positive brakes and/or positive clutches, such as, for example, synchronizing mechanisms or claw clutches, can also be used as shifting elements.

Figure 11:
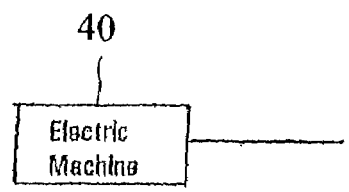
FIG. 11 is a diagrammatic view of an embodiment of the inventive multi-speed transmission with an electric machine.

Another advantage of the multi-speed transmission presented herein in FIG. 11, is that an electric machine 40 can be mounted on each shaft as a generator and/or as an additional drive engine.

Any embodiment configuration, in particular any spatial arrangement of the planetary gear sets and the shifting elements per se as well as in relation to one another, is understood to be covered under the protective scope of the claims, as long as it is practical from the technical point of view, and does not influence the function of the transmission as disclosed in the claims, even if these embodiments are not explicitly depicted in the FIGS. or described in the disclosure.

REFERENCE SYMBOLS 0 shaft
1 shaft
2 shaft
3 shaft
4 shaft
5 shaft
6 shaft
03 brake
04 brake
05 brake
06 brake
15 clutch
45 clutch
46 clutch
P1 planetary gear set
P2 planetary gear set
P3 planetary gear set
An input
Ab output
i gear ratio
phi progression ratio
G housing

The invention claimed is:

1. A multi-speed automatic transmission of planetary design for a motor vehicle, the transmission comprising:
an input shaft (1) and an output shaft (2) arranged in a housing (G);
first, second, and third planetary gear sets (P1, P2, P3), each of the first, the second, and the third planetary gear sets (P1, P2, P3) comprising a sun gear, a carrier and a ring gear;
at least third, fourth, fifth, and sixth rotatable shafts (3, 4, 5, 6) as well as at least six shifting elements (03, 04, 05, 06, 15, 45, 46), comprising first, second and third brakes (03, 04, 05, 06) and first, second and third clutches (15, 45, 46), whose selective engagement creates different gear ratios between the input shaft (1) and the output shaft (2) so that at least seven forward gears and one reverse gear can be implemented;
wherein the input shaft (1) is permanently connected to the sun gear of the second planetary gear set (P2) and is detachably connected, via the first clutch (15) to the fifth shaft (5);
the output shaft (2) is permanently connected to the ring gear of the third planetary gear set (P3);
the third shaft (3) is permanently connected to the ring gear of the second planetary gear set (P2) and the carrier of the first planetary gear set (P1), the fourth shaft (4) is permanently connected to the carrier of the second planetary gear set (P2), and is detachably connected, via the second brake (04), to the housing (G), and, via the third clutch (46), to the sixth shaft (6);
the fifth shaft (5) is permanently connected to the carrier of the third planetary gear set (P3), and is detachably connected, via the third brake (05), to the housing (G), and, via the second clutch (45), to the fourth shaft (4);
the sixth shaft (6) is permanently connected to the sun gear of the third planetary gear set (P3) and the ring gear of the first planetary gear set (P1);
the sun gear of the first planetary gear set (P1) is fixed to the housing (G); and
one of the third shaft (3) is detachably connected, via the first brake (03), to the housing (G) and the sixth shaft (6) is detachably connected, via the first brake (06) to the housing (G).

2. The multi-speed transmission of claim 1, wherein the first planetary gear set (P1), the second planetary gear set (P2), and the third planetary gear set (P3) are arranged in an axial direction in the sequential order of:
the first planetary gear set (P1), the second planetary gear set (P2), and the third planetary gear set (P3).

3. The multi-speed transmission of claim 1, wherein the first planetary gear set (P1), the second planetary gear set (P2), and the third planetary gear set (P3) are negative planetary gear sets.

4. The multi-speed transmission of claim 1, wherein from an axial point of view, the second clutch (45) and the first clutch (15) are arranged before, in a direction of power flow, the third planetary gear set (P3) in the sequential order of the first clutch (15) and the second clutch (45).

5. The multi-speed transmission of claim 1, wherein the second clutch (45) and the first clutch (15) are disk clutches and have a common outer disk carrier.

6. The multi-speed transmission of claim 1, wherein first gear results from engagement of the third brake (05) and the second clutch (45), second gear results from engagement of the second clutch (45) and the first brake (03, 06), third gear results from engagement of the second clutch (45) and the third clutch (46), fourth gear results from engagement of the first clutch (15) and the second clutch (45), fifth gear results from engagement of the first clutch (15) and the third clutch (46), sixth gear results from engagement of the first clutch (15) and the first brake (03, 06), and seventh gear results from engagement of the second brake (04) and the first clutch (15).

7. The multi-speed transmission of claim 1, wherein the reverse gear results from engagement of the third brake (05) and the third clutch (46).

8. The multi-speed transmission of claim 1, wherein at least one one-way clutch is located within the transmission.

9. The multi-speed transmission of claim 8, wherein the at least one one-way clutch is located between the input shaft (1), the output shaft (2), the third shaft (3), the fourth shaft (4), the fifth shaft (5), and the sixth shaft (6) and the housing (G).

10. The multi-speed transmission of claim 1, wherein input and output of the transmission are located on a common side of the housing (G).

11. The multi-speed transmission of claim 1, wherein at least one of an axle differential and a distributor differential is located on one of an input side and an output side of the transmission.

12. The multi-speed transmission of claim 1, wherein a coupling element facilitates separation of the input shaft (1) from a drive motor.

13. The multi-speed transmission of claim 12, wherein the coupling element is one of a hydrodynamic converter, a hydraulic clutch, a dry starting clutch, a wet starting clutch, a magnetic powder clutch, and a centrifugal clutch.

14. The multi-speed transmission of claim 1, wherein an external driving element is located downstream of the transmission, in a direction of power flow, and the input shaft (1) is firmly connected to a crankshaft of a drive motor.

15. The multi-speed transmission of claim 1, wherein the vehicle is started via one of the six shifting elements (05) of the transmission, and the input shaft (1) is permanently connected to a crankshaft of a drive motor.

16. The multi-speed transmission of claim 1, wherein a torsional vibration damper is located between a drive motor and the transmission.

17. The multi-speed transmission of claim 1, wherein a wear-free brake is arranged on at least one of the input shaft (1), the output shaft (2), the third shaft (3), the fourth shaft (4), the fifth shaft (5), and the sixth shaft (6).

18. The multi-speed transmission of claim 1, wherein a power take-off is arranged on at least one of the input shaft (1), the output shaft (2), the third shaft (3), the fourth shaft (4), the fifth shaft (5), and the sixth shaft (6) for driving an additional unit.

19. The multi-speed transmission of claim 18, wherein the power take-off is arranged on one of the input shaft (1) and on the output shaft (2).

20. The multi-speed transmission of claim 1, wherein each of the at least six shifting elements is one of a power-shift clutch and a power-shift brake.

21. The multi-speed transmission of claim 1, wherein each of the at least six shifting elements is a multi-disk clutch, a band brake, and a cone clutch.

22. The multi-speed transmission of claim 1, wherein each of the at least six shifting elements is one of a positive brake and a positive clutch.

23. The multi-speed transmission of claim 1, wherein an electric machine is arranged on at least one of the input shaft (1), the output shaft (2), the third shaft (3), the fourth shaft (4), the fifth shaft (5), and the sixth shaft (6) as one of a generator and an additional drive unit.

* * * * *